US012794347B2

(12) United States Patent
Lin et al.

(10) Patent No.: US 12,794,347 B2
(45) Date of Patent: Nov. 10, 2026

(54) POWER SUPPLY UNIT FOR IMPROVED LOW-LOAD EFFICIENCY

(71) Applicant: DELL PRODUCTS L.P., Round Rock, TX (US)

(72) Inventors: Chung-Yi Lin, Yangmei District (TW); Shih-Chieh Wang, New Taipei City (TW); Chung-Fu Lai, Tamsui (TW)

(73) Assignee: Dell Products L.P., Round Rock, TX (US)

( * ) Notice: Subject to any disclaimer, the term of this patent is extended or adjusted under 35 U.S.C. 154(b) by 207 days.

(21) Appl. No.: 18/642,507

(22) Filed: Apr. 22, 2024

(65) Prior Publication Data

US 2025/0330100 A1 Oct. 23, 2025

(51) Int. Cl.

| | |
|---|---|
| ***H02M 1/10*** | (2006.01) |
| ***G06F 1/26*** | (2006.01) |
| ***H02M 7/219*** | (2006.01) |
| *H02M 1/00* | (2006.01) |

(52) U.S. Cl.

CPC ................ *H02M 1/10* (2013.01); *G06F 1/26* (2013.01); *H02M 7/219* (2013.01); *H02M 1/0032* (2021.05)

(58) Field of Classification Search

CPC ...... H02M 1/10; H02M 7/219; H02M 1/0032; H02M 7/217

See application file for complete search history.

(56) References Cited

U.S. PATENT DOCUMENTS

| | | | | | |
|---|---|---|---|---|---|
| 6,137,700 | A * | 10/2000 | Iida | H02M 1/4208 | 323/299 |
| 6,147,882 | A * | 11/2000 | Huber | H02M 1/4258 | 363/39 |
| 10,224,809 | B1 | 3/2019 | Agrawal et al. | | |
| 11,323,023 | B2 | 5/2022 | Yamane | | |
| 2006/0007718 | A1 * | 1/2006 | Chou | H02M 7/06 | 363/125 |
| 2017/0104409 | A1 * | 4/2017 | Cohen | H02M 1/10 | |

FOREIGN PATENT DOCUMENTS

| | | | | |
|---|---|---|---|---|
| CN | 113972827 B * | 4/2024 | H02M 1/4233 | |

* cited by examiner

*Primary Examiner* — Lakaisha Jackson

(74) *Attorney, Agent, or Firm* — Larson Newman, LLP

(57) ABSTRACT

A power supply unit for an information handling system includes a voltage rectifier/voltage doubler stage and a bulk capacitor stage. The voltage rectifier/voltage doubler stage receives an alternating current input and provides a direct current output. The bulk capacitor stage is coupled between the direct current output. When an input voltage of the alternating current input is above a threshold voltage, the voltage regulator/voltage double stage is configured as a full-wave synchronous voltage rectifier. When the input voltage is below the threshold voltage, the voltage rectifier/voltage doubler stage is configured as a full-wave synchronous voltage doubler.

18 Claims, 4 Drawing Sheets

(High Load/ Positive Cycle)

(High Load/ Negative Cycle)

(Low Load/ Positive Cycle)

(Low Load/ Negative Cycle)

POWER SUPPLY UNIT FOR IMPROVED LOW-LOAD EFFICIENCY

FIELD OF THE DISCLOSURE

This disclosure generally relates to information handling systems, and more particularly relates to providing a power supply unit for improved low-load efficiency in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A power supply unit for an information handling system may include a voltage rectifier/voltage doubler stage and a bulk capacitor stage. The voltage rectifier/voltage doubler stage may receive an alternating current input and provide a direct current output. The bulk capacitor stage may be coupled between the direct current output. When an input voltage of the alternating current input is above a threshold voltage, the voltage regulator/voltage double stage may be configured as a full-wave synchronous voltage rectifier. When the input voltage is below the threshold voltage, the voltage rectifier/voltage doubler stage may be configured as a full-wave synchronous voltage doubler.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
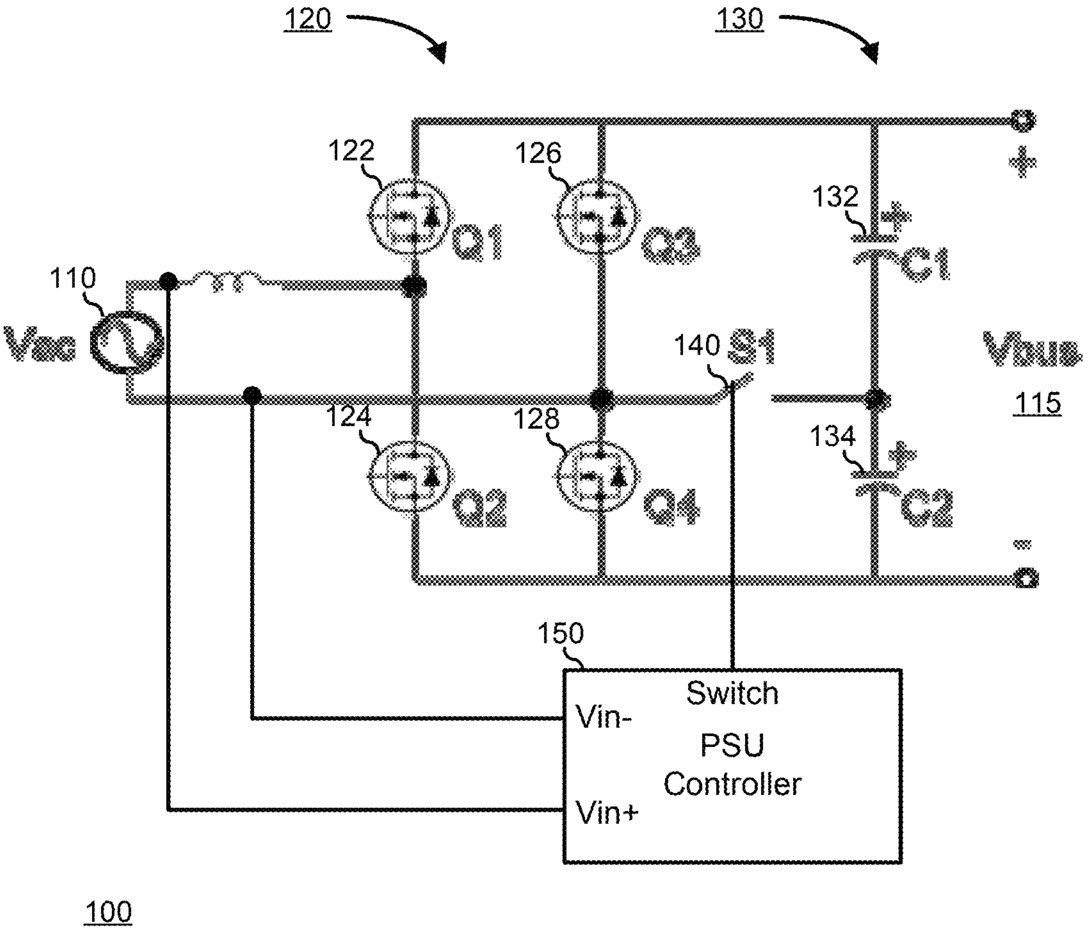
FIG. 1 is a schematic diagram of a power supply unit (PSU) according to an embodiment of the present disclosure.

FIG. 1 illustrates a power supply unit (PSU) 100 as may be found in an information handling system. PSU 100 is a totem-pole power factor correction (PFC) power supply that acts as a full-wave voltage rectifier/voltage doubler. PSU 100 includes an AC power source 110, a rectifier/doubler stage 120, a bulk capacitor stage 130, and a switch 140, and provides an output voltage (Vbus) 115. Power source 110 represents a wide range of input voltages in order to accommodate various national grid standards, as needed or desired. For example, power source 110 may provide an input voltage of between 90-264 VAC. Rectifier/doubler 120 includes rectifying elements 122 (Q1), 124 (Q2), 126 (Q3), and 128 (Q4). Rectifying elements 122, 124, 126, and 128 may represent any type of rectifying element, such as diodes, Schottky barrier diodes, or the like. However, recently Silicon Carbide (SiC) or Gallium Nitride (GaN wide bandgap MOSFET devices are commonly used in totem-pole PFC power supplies to mitigate slow body diode reverse-recovery issues, such as large current spikes and power loss. Thus rectifying elements 122, 124, 126, and 128 are illustrated as MOSFETs with their body diodes acting as the rectifiers. Bulk capacitor stage 130 includes a positive side capacitor 132 and a negative side capacitor 134.

A positive terminal of power source 110 is connected to an anode terminal of rectifier element 122 and to a cathode terminal of rectifier element 124. A negative terminal of power source 110 is connected to an anode terminal of rectifier element 122, to a cathode terminal of rectifier element 128, and to a first terminal of switch 140. Anode terminals of rectifier elements 122 and 126 are connected together to provide a positive voltage terminal of output voltage 115, and are further connected to a first terminal of capacitor 132. Cathode terminals of rectifier elements 124 and 128 are connected together to provide a negative voltage terminal of output voltage 115, and are further connected to a first terminal of capacitor 134. A second terminal of switch 140 is connected to the second terminals of capacitor 132 and capacitor 134.

It has been understood by the inventors of the current disclosure that, as industry is driving for more energy saving, power supply efficiency is being pushed to higher levels through the implementation of different regulatory requirement such as, 80plus, Erp lot9, or the like. Typically, efficiency gains were targeted to improving mid- to high-load efficiency, but light-load efficiency is becoming challenging for power supply design. Key power loss contributors at light-load conditions may include switching loss, magnetic core loss, slow body diode reverse recovery issues, or the like. In information handling systems, power supplies such as PSU 100 are typically connected to DC-to-DC switching rectifiers to provide the voltages utilized by the information handling system, and typically achieve efficiencies around 96%. However, maintaining such efficiency levels with low input voltages or at light-load conditions remains challenging with current power supply designs.

Figure 2A:
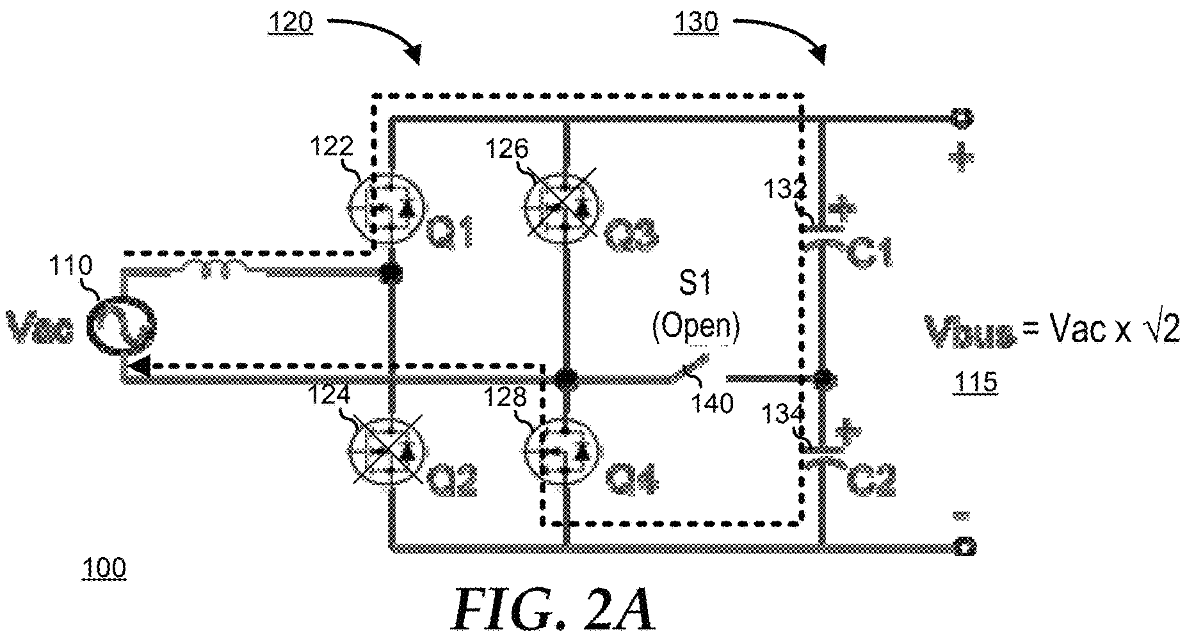
FIGS. 2A, 2B, 3A and 3B illustrate various operating modes for the PSU of FIG. 1.
Figure 2B:
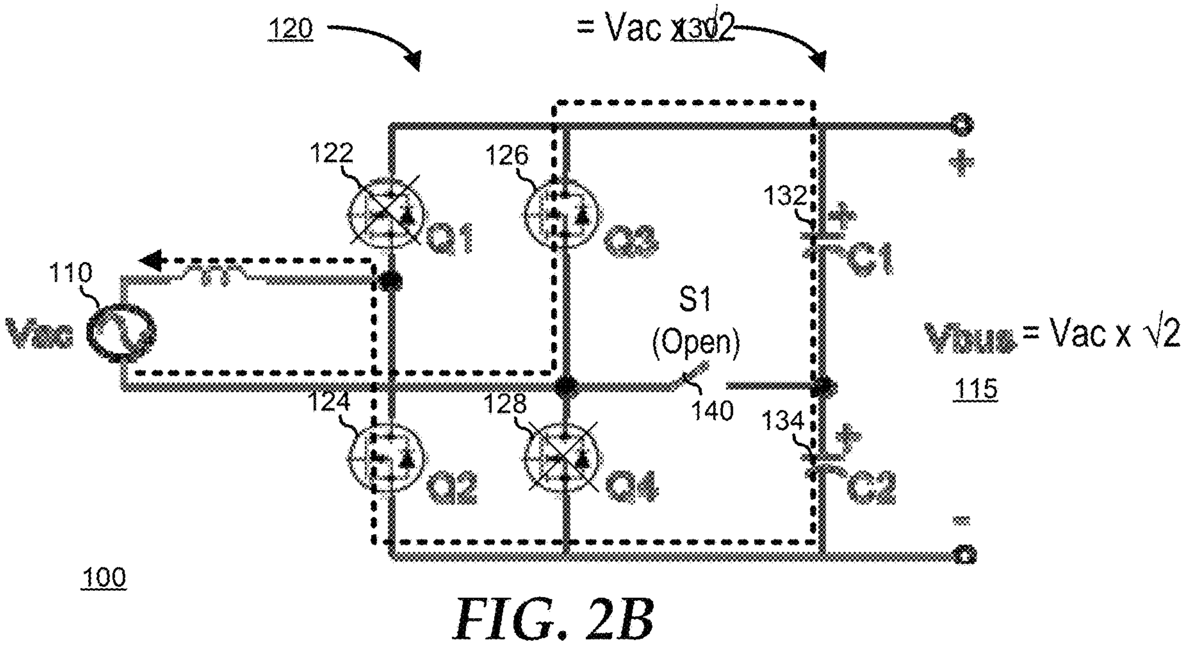

PSU 100 operates alternately as a full-wave synchronous voltage rectifier at high-line AC input levels, and as a full-wave synchronous voltage doubler at low-line AC input levels. FIGS. 2A and 2B illustrate PSU 100, as operated under a high-load condition, such as when the input voltage of power source 110 is 180-264 VAC. In particular, FIG. 2A shows the operation during a positive cycle portion of the AC input cycle. Current flows from the positive terminal of power source 110, through rectifier element 122, through capacitors 132 and 134, and returns to the negative terminal of the power source through rectifier element 128. FIG. 2B shows the operation during a negative cycle portion of the AC input cycle. Current flows from the negative terminal of power source 110, through rectifier element 126, through capacitors 132 and 134, and returns to the positive terminal of the power source through rectifier element 124. In both phases, a positive output voltage is maintained on bulk capacitors 130 that is equal to:

$$Vbus = Vac \times \sqrt{2} \text{ (e.g. 254-368 } VDC\text{)}, \qquad \text{Equation 1}$$

and in both phases, switch 140 is in an open state.

Figure 3A:
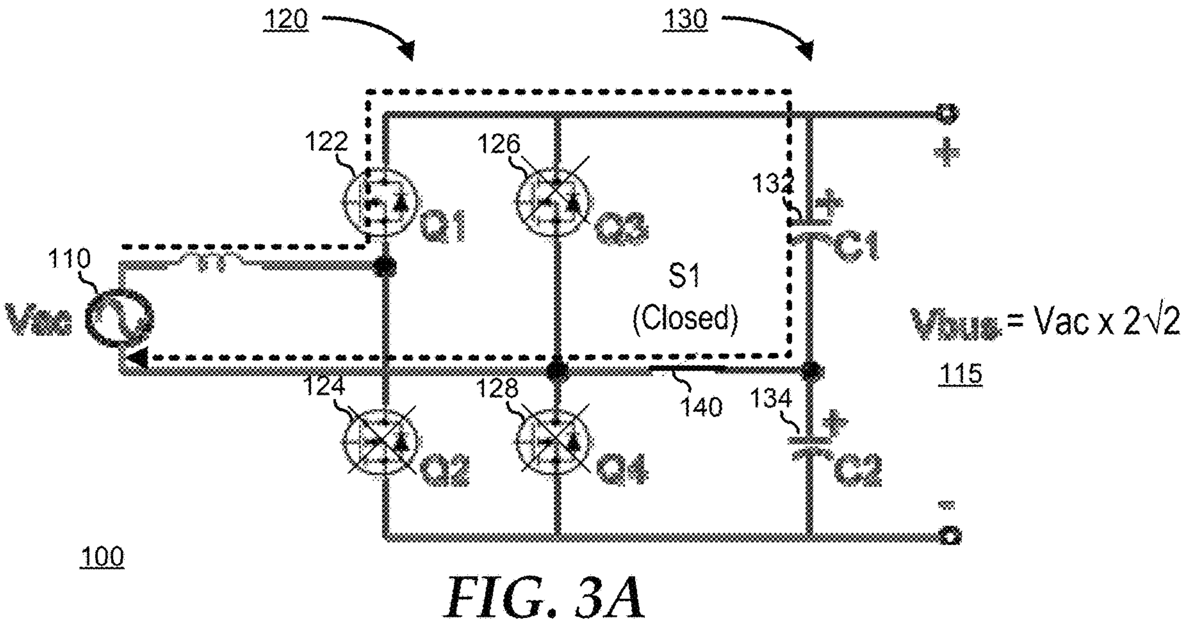
Figure 3B:
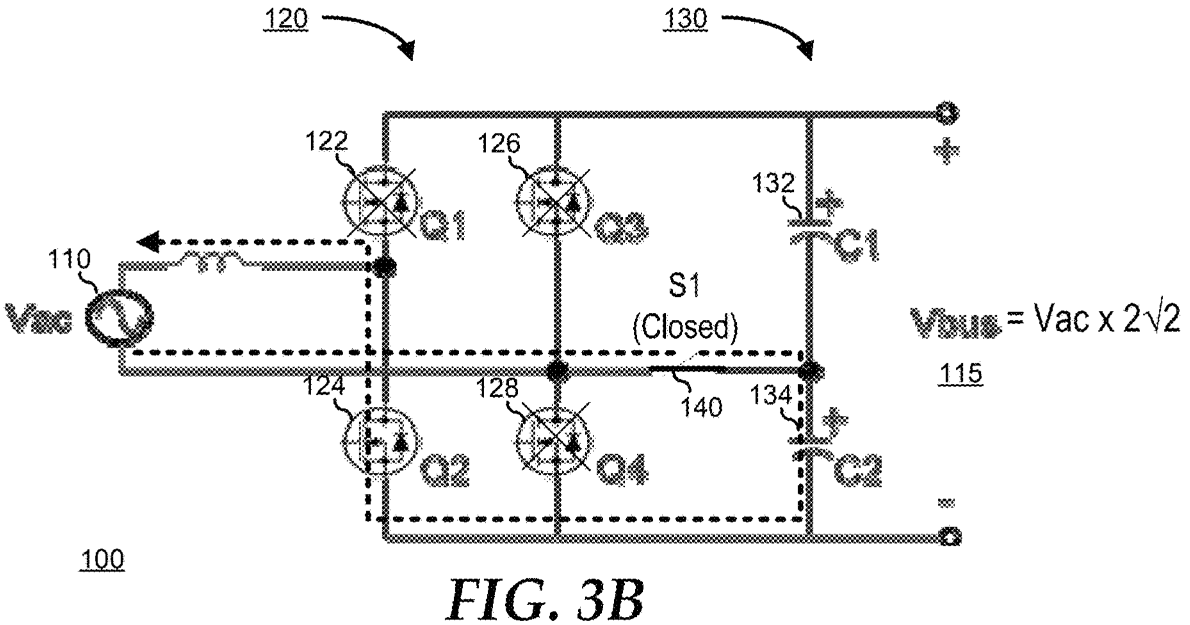

In light-load conditions, switch 140 is in a closed state, disabling the full-wave voltage rectifier operation, and enabling the full-wave synchronous voltage doubler operation. FIGS. 3A and 3B illustrate PSU 100, as operated under a light-load condition, e.g., when the input voltage of power source 110 is 90-132 VAC. In particular, FIG. 3A shows the operation during a positive cycle portion of the AC input cycle. Current flows from the positive terminal of power source 110, through rectifier element 122, through capacitor 132 and switch 140, and returns to the negative terminal of the power source through rectifier element 128. FIG. 3B shows the operation during a negative cycle portion of the AC input cycle. Current flows from the negative terminal of power source 110, through switch 140 and capacitor 134, and returns to the positive terminal of the power source through rectifier element 124. In both phases, a positive output voltage is maintained during both phases on each of capacitors 132 and 134 that is equal to:

$$Vcap = Vac \times \sqrt{2}, \qquad \text{Equation 2}$$

and in a positive output voltage is maintained on bulk capacitors 130 that is equal to:

$$Vbus = Vac \times 2\sqrt{2} \text{ (e.g. 254-368 } VDC\text{)}, \qquad \text{Equation 3}$$

and in both phases, switch 140 is in a closed state.

During high-load condition operation two (2) rectifier elements are always on, and two (2) rectifier elements are always off. For example during positive cycle, rectifier elements 122 and 128 are on and rectifier elements 124 and 126 are off, and during negative cycles, rectifier elements 124 and 126 are on and rectifier elements 122 and 128 are off. In contrast, during light-load condition operation, only one (1) rectifier element is one, while three (3) rectifier elements are always off. For example during positive cycle, rectifier element 122 is on and rectifier elements 124, 126, and 128 are off, and during negative cycles, rectifier element 124 is on and rectifier elements 122, 126, and 128 are off. Thus light-load operation efficiency of PSU 100 is improved by the reduction of switching losses in rectifier/doubler stage 120. Further, the voltage doubling provided on output voltage (Vbus) 115 during light-load operation may result in greater switching efficiencies within downstream voltage regulation elements, such as DC-to-DC switching rectifiers, or the like. An additional benefit in the light-load operating condition is that the voltage doubling of output voltage (Vbus) 115 reduces the input voltage range of the LLC resonate tank circuit design, thereby making it easier to design for optimized power gain efficiency.

Returning to FIG. 1, PSU 100 further includes a PSU controller 150. PSU controller 100 has input voltage sensor inputs (Vin+ and Vin−) that detect the input voltage of input power source 110. PSU controller 150 further includes a switch output (Switch) that operates to control the state of switch 140 as described above.

Figure 4:
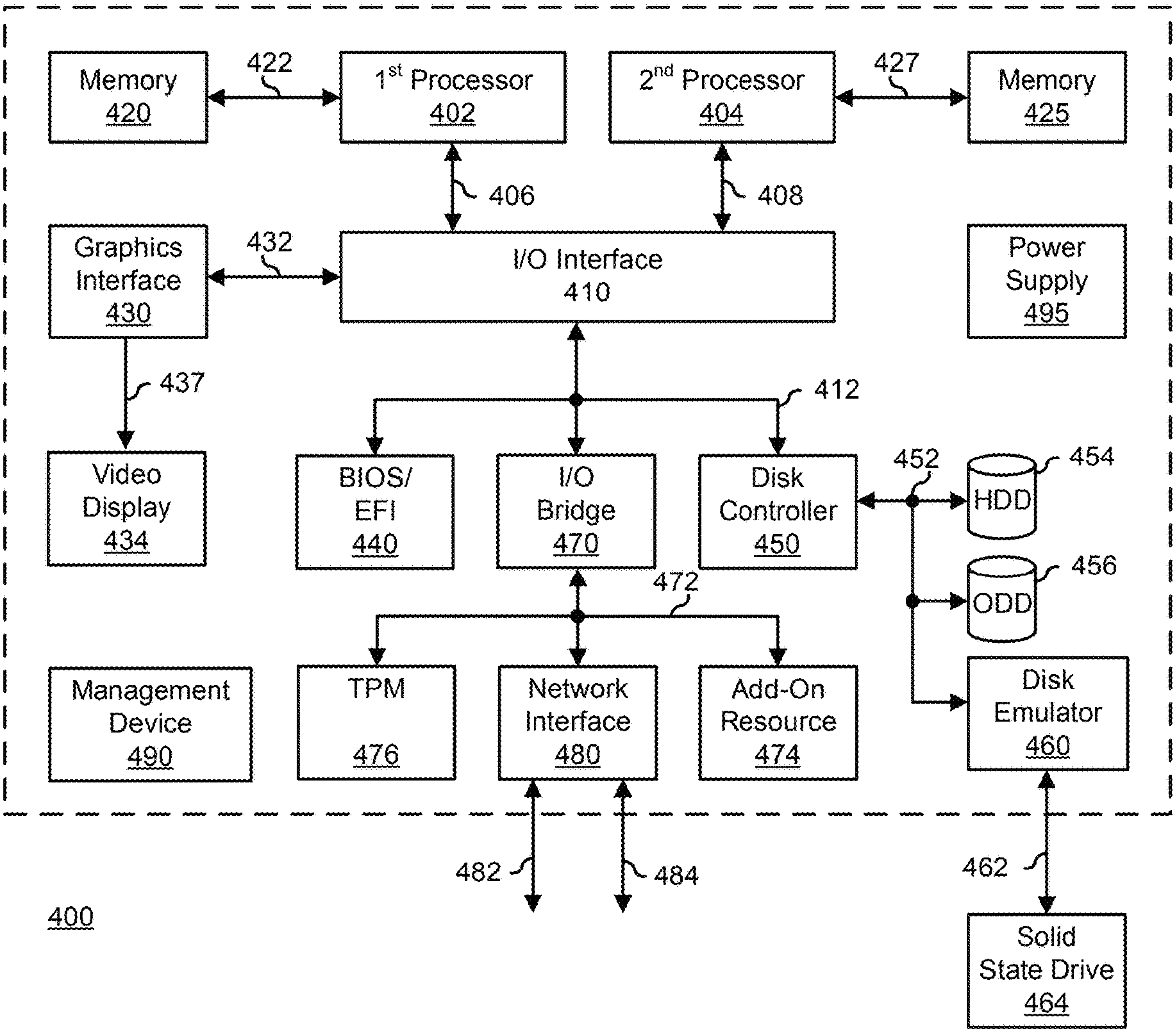
FIG. 4 is a block diagram illustrating a generalized information handling system according to another embodiment of the present disclosure.

FIG. 4 illustrates a generalized embodiment of an information handling system 400 similar to information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 where peripheral interface 472 and the I/O channel are of the same type, and the I/O bridge translates information from a format suitable to the I/O channel to a format suitable to the peripheral channel 472 where they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 where the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A power supply unit for an information handling system, the power supply unit comprising:

a voltage rectifier/voltage doubler stage configured to receive an alternating current input and to provide a direct current output; and a bulk capacitor stage coupled between the direct current output, wherein when an input voltage of the alternating current input is above a threshold voltage, the voltage regulator/voltage double stage is configured as a full-wave synchronous voltage rectifier, and when the input voltage is below the threshold voltage, the voltage rectifier/voltage doubler stage is configured as a full-wave synchronous voltage doubler;

wherein the voltage rectifier/voltage doubler stage includes:

a first MOSFET having a first contact type coupled to a positive side of the alternating current input, and having a second contact type coupled to a positive side of the direct current output;

a second MOSFET having the first contact type coupled to a negative side of the direct current output, and having the second contact type coupled to the positive side of the alternating current input;

a third MOSFET having the first contact type coupled to the negative side of the alternating current input, and having the second contact type coupled to the positive side of the direct current output; and a fourth MOSFET having the first contact type coupled to the negative side of the direct current output, and having the second contact type coupled to the negative side of the alternating current input, wherein the first contact type is associated with an anode of a body diode of the associated MOSFET, and the second contact type is associated with a cathode of the body diode of the associated MOSFET.

2. The power supply unit of claim 1, wherein, when the input voltage of the alternating current input is above the threshold voltage, the first MOSFET, the second MOSFET, the third MOSFET, and the fourth MOSFET all conduct current during a single cycle of the alternating current input.

3. The power supply unit of claim 1, wherein, when the input voltage of the alternating current input is below the threshold voltage, the first MOSFET and the second MOSFET both conduct current during a single cycle of the alternating current input, and neither the third MOSFET nor the fourth MOSFET conduct current during the single cycle.

4. The power supply unit of claim 1, wherein the bulk capacitor stage includes a first capacitor and a second capacitor.

5. The power supply unit of claim 4, wherein a first terminal of the first capacitor is coupled to a positive side of the direct current output, a second terminal of the first capacitor is coupled to a first terminal of the second capacitor, and a second terminal of the second capacitor is coupled to a negative side of the direct current output.

6. The power supply unit of claim 5, further comprising a switch having a first terminal coupled to a negative side of the alternating current input and a second terminal coupled to the second terminal of the first capacitor and to the second terminal of the second capacitor.

7. The power supply unit of claim 6, wherein, when the input voltage of the alternating current input is above the threshold voltage, the switch is in an open state, and, when the input voltage of the alternating current input is below the threshold voltage, the switch is in a closed state.

8. The power supply unit of claim 7, further comprising a controller configured to detect the input voltage of the alternating current input.

9. The power supply unit of claim 8, wherein the controller is further configured to set the switch to the open state when the input voltage of the alternating current input is above the threshold voltage, and to set the switch to the closed state when the input voltage of the alternating current input is below the threshold voltage.

10. A method, comprising:

receiving, by a voltage rectifier/voltage doubler stage of a power supply unit, an alternating current input;

providing, by the voltage rectifier/voltage doubler stage, a direct current output;

coupling a bulk capacitor stage between the direct current output;

configuring the voltage regulator/voltage double stage as a full-wave synchronous voltage rectifier when an input voltage of the alternating current input is above a threshold voltage;

configuring the voltage regulator/voltage double stage is configured as a full-wave synchronous voltage doubler when the input voltage is below the threshold voltage;

providing, in the voltage rectifier/voltage doubler, stage, a first MOSFET having a first contact type coupled to a positive side of the alternating current input, and having a second contact type coupled to a positive side of the direct current output;

providing, in the voltage rectifier/voltage doubler, stage, a second MOSFET having the first contact type coupled to a negative side of the direct current output, and having the second contact type coupled to the positive side of the alternating current input;

providing, in the voltage rectifier/voltage doubler, stage, a third MOSFET having the first contact type coupled to the negative side of the alternating current input, and having the second contact type coupled to the positive side of the direct current output; and providing, in the voltage rectifier/voltage doubler, stage, a fourth MOSFET having the first contact type coupled to the negative side of the direct current output, and having the second contact type coupled to the negative side of the alternating current input, wherein the first contact type is associated with an anode of a body diode of the associated MOSFET, and the second contact type is associated with a cathode of the body diode of the associated MOSFET.

11. The method of claim 10, wherein, when the input voltage of the alternating current input is above the threshold voltage, the first MOSFET, the second MOSFET, the third MOSFET, and the fourth MOSFET all conduct current during a single cycle of the alternating current input.

12. The method of claim 10, wherein, when the input voltage of the alternating current input is below the threshold voltage, the first MOSFET and the second MOSFET both conduct current during a single cycle of the alternating current input, and neither the third MOSFET nor the fourth MOSFET conduct current during the single cycle.

13. The method of claim 10, further comprising providing, in the bulk capacitor stage, a first capacitor and a second capacitor.

14. The method of claim 13, wherein a first terminal of the first capacitor is coupled to a positive side of the direct current output, a second terminal of the first capacitor is coupled to a first terminal of the second capacitor, and a second terminal of the second capacitor is coupled to a negative side of the direct current output.

15. The method of claim 14, further comprising providing, in the power supply unit, a switch having a first terminal coupled to a negative side of the alternating current input and a second terminal coupled to the second terminal of the first capacitor and to the second terminal of the second capacitor.

16. The method of claim 15, wherein, when the input voltage of the alternating current input is above the threshold voltage, the switch is in an open state, and, when the input voltage of the alternating current input is below the threshold voltage, the switch is in a closed state.

17. The method of claim 16, further comprising:

providing, in the power supply unit, a controller;

detecting, by the controller, the input voltage of the alternating current input;

setting, by the controller, the switch to the open state when the input voltage of the alternating current input is above the threshold voltage; and setting, by the controller, the switch to the closed state when the input voltage of the alternating current input is below the threshold voltage.

18. A power supply unit for an information handling system, the power supply unit comprising:

a voltage rectifier/voltage doubler stage configured to receive an alternating current input and to provide a direct current output, the voltage rectifier/voltage doubler stage including:

a first MOSFET having a first contact type coupled to a positive side of the alternating current input, and having a second contact type coupled to a positive side of the direct current output;

a second MOSFET having the first contact type coupled to a negative side of the direct current output, and having the second contact type coupled to the positive side of the alternating current input;

a third MOSFET having the first contact type coupled to the negative side of the alternating current input, and having the second contact type coupled to the positive side of the direct current output; and a fourth MOSFET having the first contact type coupled to the negative side of the direct current output, and having the second contact type coupled to the negative side of the alternating current input, wherein the first contact type is associated with an anode of a body diode of the associated MOSFET, and the second contact type is associated with a cathode of the body diode of the associated MOSFET;

a bulk capacitor stage coupled between the direct current output, the bulk capacitor including a first capacitor and a second capacitor, wherein a first terminal of the first capacitor is coupled to the positive side of the direct current output, a second terminal of the first capacitor is coupled to a first terminal of the second capacitor, and a second terminal of the second capacitor is coupled to the negative side of the direct current output; and a switch having a first terminal coupled to a negative side of the alternating current input and a second terminal coupled to the second terminal of the first capacitor and to the second terminal of the second capacitor;

wherein when an input voltage of the alternating current input is above a threshold voltage, the voltage regulator/voltage double stage is configured as a full-wave synchronous voltage rectifier, and when the input voltage is below the threshold voltage, the voltage rectifier/voltage doubler stage is configured as a full-wave synchronous voltage doubler.

* * * * *